July 16, 1929.   L. P. HYNES ET AL   1,720,837

THERMOSTAT

Filed May 20, 1926

INVENTOR
LEE P. HYNES
HARRY A. WILLIAMS
BY
*E. M. Bentley*
ATTORNEY

Patented July 16, 1929.

1,720,837

UNITED STATES PATENT OFFICE.

LEE P. HYNES AND HARRY A. WILLIAMS, OF ALBANY, NEW YORK, ASSIGNORS TO HYNES & COX ELECTRIC CORPORATION, OF ALBANY, NEW YORK, A CORPORATION OF NEW YORK.

THERMOSTAT.

Application filed May 20, 1926. Serial No. 110,479.

Figure 1:
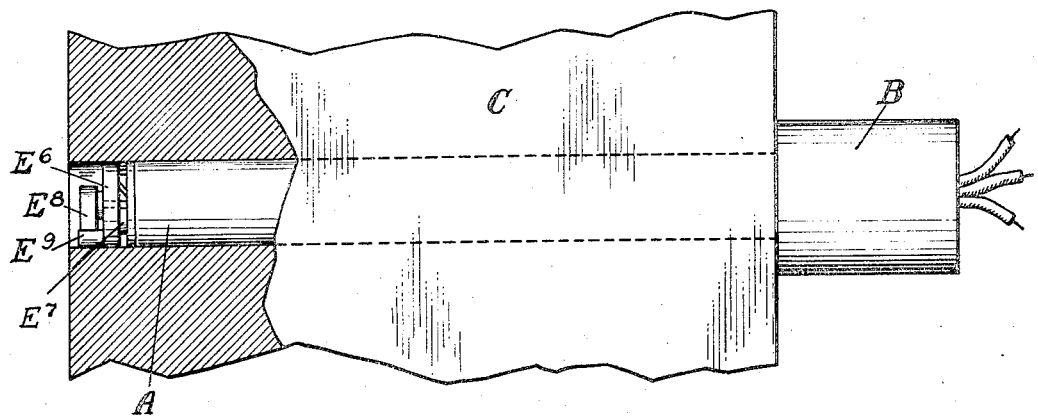
Figure 2:
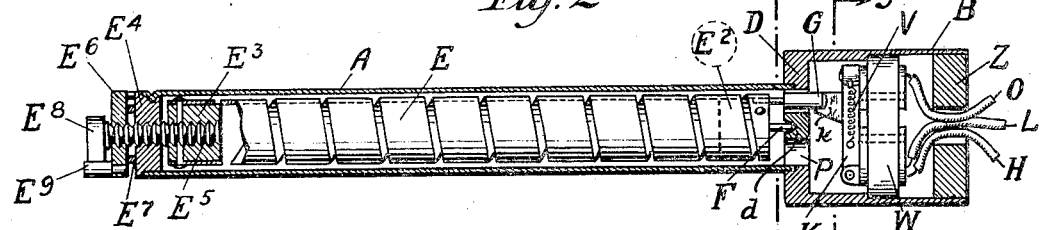
Figure 3:
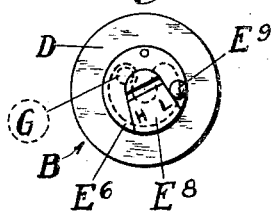
Figure 4:
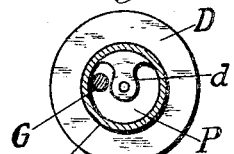
Figure 5:
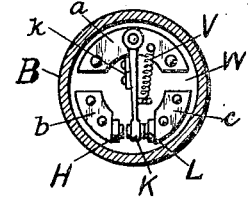
Figure 6:
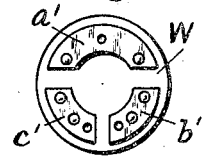

For a detailed description of the present form of our invention, reference may be had to the following specification and to the accompanying drawing forming a part thereof, wherein Fig. 1 shows our device in operating position in a die block;

Fig. 2 is a central longitudinal section thereof;

Fig. 3 an end view;

Figs. 4 and 5 are sections on the lines 4—4 and 5—5 respectively;

Fig. 6 a reverse view of the switch-disc, and

Figure 7:
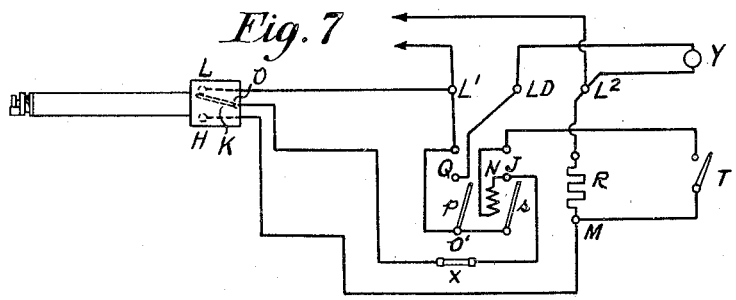

Fig. 7 shows the circuit diagram.

Our invention relates to thermostats designed particularly for use in heated die blocks for moulding rubber and other materials wherein the temperature is very high but requires to be limited and where the die itself is subject to mechanical shocks that make difficult the maintenance of delicate metering mechanism. For this and for other purposes that involve similar conditions, we have devised the following form of thermostat.

Referring to the drawing, A represents a substantial tubular body, formed of brass or other suitable metal that will endure high temperatures, which is arranged to be fitted into a hole bored through a die block C, as shown in Fig. 1. The tube A contains the temperature-responsive element which thereby is exposed to the temperature of the block which is to be heated. The electric heater itself is not shown but may be of any desired form for acting on the block, such heaters being well known to those familiar with the art. On one end of tube A is welded or brazed a cup-shaped enlargement B of similar metal. In practical embodiments of the invention the body A is about five-eighths of an inch in diameter and five inches long below the cup B. Across the lower end of cup B extends a rigid bottom disc D in which there is an arc-shaped opening or slot P, as shown in Fig. 4. In the center of this opening is the bearing-stud $d$ which has on its under side a conical socket for the reception of the needle-point bearing of the helical temperature strip E. The said strip is composed of two metals having different coefficients of expansion and contraction in response to temperature changes, such as brass and steel, and it is important to have the correct inside and outside relation of these metals to secure the desired direction of rotation of the coiled strip on its axis. In this illustration the inside metal is of brass and the outside one of steel to insure anti-clockwise rotation under increasing temperature, assuming the instrument to be viewed from its lower end. The upper or right-hand end of the strip E has firmly secured to it a cylindrical carrier-block $E^2$ from the center of which projects upwardly the pointed bearing needle F that enters the conical socket aforesaid on stud $d$. At the lower or left-hand end of strip E is firmly secured a similar cylindrical block $E^3$ which is seated, by means of a screw stem $E^5$ pinned thereto, in the bottom head $E^4$ of the tube A. The helical strip, before being inserted, is considerably longer than shown and has to be compressed longitudinally to bring it into its position between the bottom head $E^4$ and the bearing stud $d$. Thereby the resiliency of the strip itself will force the needle F into its conical socket in stud $d$. This arrangement is of importance because the strip is also thereby maintained out of contact with the side walls of tube A or any other part of the apparatus which contact would cause the strip to act sluggishly and uncertainly. By the aforesaid arrangement the strip E is securely held against rotation at its lower end and its rotation under temperature changes is confined entirely to its upper end where the needle bearing reduces the friction to a negligible factor.

Near the periphery of the aforesaid block $E^2$ there projects upwardly therefrom a steel operating-pin G which is encased in heat-proof insulation and extends upward beyond the bearing stud $d$ to a point where it will engage a downwardly projecting lug $k$ on the switch-blade K which is mounted on insulating disc W. This engagement occurs when the said pin G, which, as the strip E rotates at its upper end, moves in a circular route around stud $d$ as a center, is near the end of the arc-shaped slot P as shown in Fig. 4. That represents the upper limit of the heat. The pin G will not strike the opposite end of slot P. This will protect the strip E against mechanical strain which would occur if the pin acted as a stop therefor when the strip is adjusted as hereinafter described. At the upper limit as represented by the position of pin G in Fig. 4, the strip is protected by the opening of the circuit which cuts off the heat and terminates the rotary torque on the strip. This circuit-shift by the action of switch K takes place when the said pin G moves the switch-blade from its low-temperature position to its high-temperature position as will be hereinafter explained.

The aforesaid screw-stem $E^5$ projecting from block $E^3$ passes through the head $E^4$ of tube A and then through a nut $E^6$ connected with head $E^4$ by slide pins. Between $E^4$ and $E^6$ is a spring lock-washer $E^7$. On the end of the screw-stem $E^5$ is secured an adjustment block $E^8$ having on its outer face a screw-driver slot as shown in Fig. 3. A stop pin $E^9$ for the block $E^8$ is fixed in the nut $E^6$. By inserting a screw-driver in block $E^8$ the screw-stem $E^5$, together with the strip-block $E^3$ pinned thereto, may be turned to give the strip E its desired angular setting and at whatever angle it may be set it will be retained by the lock-washer $E^7$. For temperature above 400 degrees, however, the lock-washer will not hold its resiliency and a set screw should be substituted therefor. By this arrangement the sensitive strip E may be set initially at any desired angle and there locked. From that point the operating pin G will move along its circular route as the heat increases, till it finally works the switch K. The switch K is mounted on the under side of the refractory disc W, being pivoted at one end on the sector $a$ while its opposite free end plays between contact points H and L on the respective sectors $b$ and $c$. On the rear side of disc W are the corresponding sectors $a'$, $b'$, $c'$, to which are connected the respective lead wires that enter through a central opening in the outer refractory disc Z. The asbestos cover on wire O leading to sectors $a$ and $a'$ is colored white, while the coverings on wires H and L leading respectively to sectors $b$ and $b'$ and to sectors $c$ and $c'$ are colored red and blue.

The circuits employed with this thermostat are shown in Fig. 7, although we make no claim thereto in this application. The switch-lever K normally stands in contact with a contact-point L and there remains by virtue of the tension of spring V. Then on closing hand-switch T the current from positive line-terminal $L^1$ on the panel flows to point L on the thermostat, thence to switch K, point $o$, fuse X, magnet N, hand-switch T, point M, resistance R, to negative line-terminal $L^2$. This circuit is a control-circuit established by closing the hand-switch T. The magnet N immediately acts to close switch-blade $p$ and $s$ on points Q and J. Then from said terminal $L^1$ a second parallel circuit to the heater Y is established via point $o^1$, blade $p$, point Q, heater-terminal L D, heater Y, negative terminal $L^2$. Also a third maintaining circuit from line-terminal $L^1$ is established via point $o^1$ aforesaid, blade $s$, point J, magnet N, and the control-circuit heretofore traced. This third circuit simply short-circuits the thermostat contact of switch K on point L which can then be broken without a spark while still retaining the magnet N in its energized condition. When the maximum temperature is reached the strip E has turned so that pin G has shifted switch K from L to H. The effect of this is to short-circuit magnet N in the aforesaid third circuit. From point J in that circuit the current which previously passed through magnet N to resistance R and negative terminal $L^2$, now passes from said point J to fuse X, switch K, point H, point N, and thence to resistance R and negative line-terminal $L^2$. Magnet N, being thus short-circuited, drops the blades $p$ and $s$ out of contact with points Q and J, thereby opening all the circuits, since the aforesaid control-circuit has been opened at the point L. If the hand-switch T remains closed the said control-circuit will be re-established when the temperature falls sufficiently to bring switch K back to contact L and the operation will be repeated.

What we claim as new and desire to secure by Letters Patent is:

1. A thermostat comprising a tubular body casing, a helically coiled temperature responsive member extending longitudinally therethrough, an adjusting disk connected with one end of said element for fixing the angular relation of that end with respect to the casing, a bearing disk by which the other end of the temperature responsive member is supported, the last mentioned disk having an arcuate slot therein, and a switch operating member connected with the last mentioned end of the temperature responsive member and projecting through said slot.

2. A thermostat comprising a tubular body casing, a helically coiled temperature responsive member extending longitudinally therethrough, an adjusting disk connected with one end of said temperature responsive member for fixing the angular relation of that end with respect to the casing, a disk having a bearing stud provided with a recess in which the other end of said temperature responsive member is mounted, said last mentioned disk having an arcuate slot concentric with said recess, and a switch operating member connected with the temperature responsive member and projected through said slot.

3. A thermostat of the character described comprising a tubular body casing, a helically coiled temperature responsive bearing extending longitudinally therethrough, adjustable means connected with one end of said temperature responsive element and constructed to fix the angular relation of that end with respect to the casing, a carrier block connected with the other end of said temperature responsive member and provided with a bearing pin, a bearing disk engaged by said pin and provided with an arcuate slot, and a switch operating member supported by said carrier block and extended through said slot.

4. A thermostat of the character described comprising a tubular body casing, a helically coiled temperature responsive member extending therethrough, a bearing block, a head carried by one end of said temperature responsive element, a screw member adjustably connecting said head and said block, a bearing disk by which the other end of the temperature responsive member is supported, said disk having an arcuate slot therein, and a switch operating member connected with the last mentioned end of the temperature responsive member and projecting through said slot.

5. A thermostat of the character described comprising a tubular body casing, a helically coiled temperature responsive member extending therethrough, a bearing block, a head carried by one end of said temperature responsive element, a screw member adjustably connecting said head and said block, a bearing block carried by the other end of said temperature responsive member and provided with a bearing pin, a bearing disk engaged by said pin and provided with an arcuate slot concentric with said pin, and a switch operating member supported by said carrier block and projected through said slot.

6. A thermostat provided with a tubular body-casing, a helically-coiled, heat-responsive member extending longitudinally therein, an adjusting disc at one end of said body portion and within the contour thereof for fixing the angular relation of that end of said member with respect to the body-casing, and at the other end of said body-casing an enlarged casing containing an electric switch, together with an operating-connection between said switch and the adjacent end of the said member.

Signed at Albany, county of Albany and State of New York, this 17th day of May, 1926.

LEE P. HYNES.
HARRY A. WILLIAMS.